United States Patent [19]

Chatterjea

[11] 4,132,302
[45] Jan. 2, 1979

[54] TRANSMISSION CLUTCHES WITH FULLY-RESETTING MODULATOR-LOAD-PISTON

[75] Inventor: Probir K. Chatterjea, Mount Prospect, Ill.

[73] Assignee: International Harvester Company, Chicago, Ill.

[21] Appl. No.: 737,966

[22] Filed: Nov. 2, 1976

Related U.S. Application Data

[63] Continuation-in-part of Ser. No. 693,469, Jun. 7, 1976, abandoned.

[51] Int. Cl.² ............................................. F16D 25/10
[52] U.S. Cl. ................... 192/87.13; 192/3.57; 192/109 F
[58] Field of Search ............. 192/109 F, 87.13, 87.18, 192/87.19, 3.57

[56] References Cited

U.S. PATENT DOCUMENTS

| | | | |
|---|---|---|---|
| 2,935,999 | 5/1960 | Hock et al. | 192/109 F X |
| 3,583,422 | 6/1971 | Dack | 192/109 F X |
| 3,618,424 | 11/1971 | Golan et al. | 192/109 F X |
| 3,882,738 | 5/1975 | Audiffred et al. | 192/87.13 |
| 3,991,865 | 11/1976 | Komatsu | 192/109 F |
| 4,000,795 | 1/1977 | Patton | 192/109 F |
| 4,046,162 | 9/1977 | Rodeghiero | 192/109 F |

*Primary Examiner*—Benjamin W. Wyche
*Attorney, Agent, or Firm*—John W. Gaines; Ronald C. Kamp; F. David AuBuchon

[57] ABSTRACT

A multi-functioning hydraulic transmission control circuit including interacting valve mechanism parts which, in response to a shift being called for in a clutch-cylinder-controlled multi-speed transmission, inaugurate a fill pressure flow to the clutch cylinders concerned, prior to the subsequent fluid pressure rise effected therein; thereafter, upon completion of the fill, the parts modulate pressure rise of the hydraulic clutch fluid from and at approximately actual clutch fill pressure up to, and remaining at, the final pressure of engagement.

These functions including full resetting of the parts at the beginning of each shift, and a lesser and a least gradual pressure rise afforded during respective second and third speed upshifts, are all accomplished by and among a pair of direction-selector and orificed-speed-selector valve spools connected to the transmission clutch cylinders to direct valve fluid output thereto selectively, and also 1st, dump valve, 2d, simulated clutch piston, 3d, load piston, 4th, modulator valve, and 5th, interacting spring parts collectively providing said directed valve fluid output, all in a valve bore common thereto, and arranged therein with the dump valve part confronted at one side by the simulated clutch piston part so as to define mutually therewith a differential pressure chamber in the bore, and confronted at the other side by a first side of the load piston part so as to define mutually with that first side a signal pressure chamber in the bore, and with an opposite side of the load piston part spacedly confronting the modulator valve part so that they mutually engage therebetween the interacting spring parts in the common bore.

9 Claims, 9 Drawing Figures

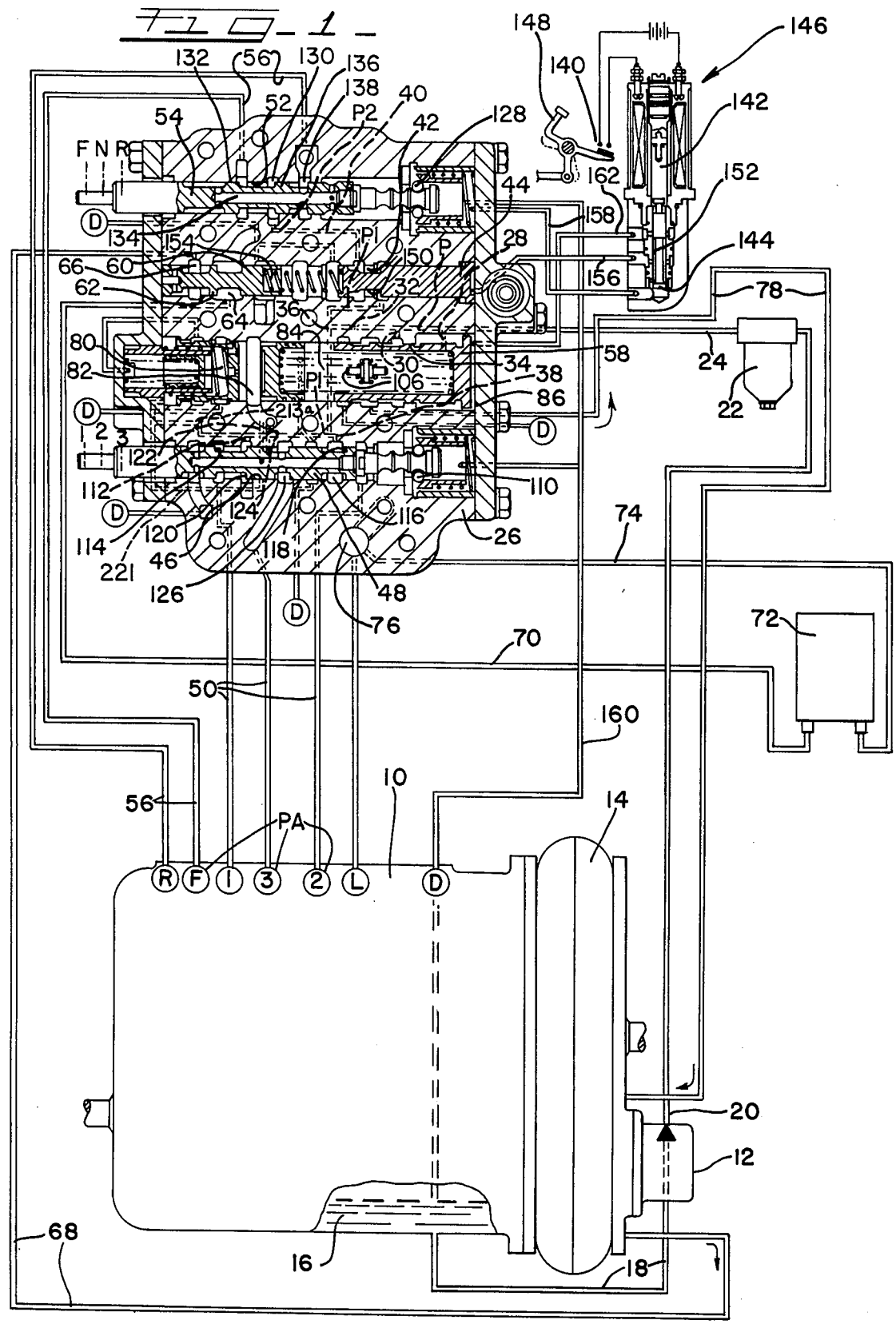

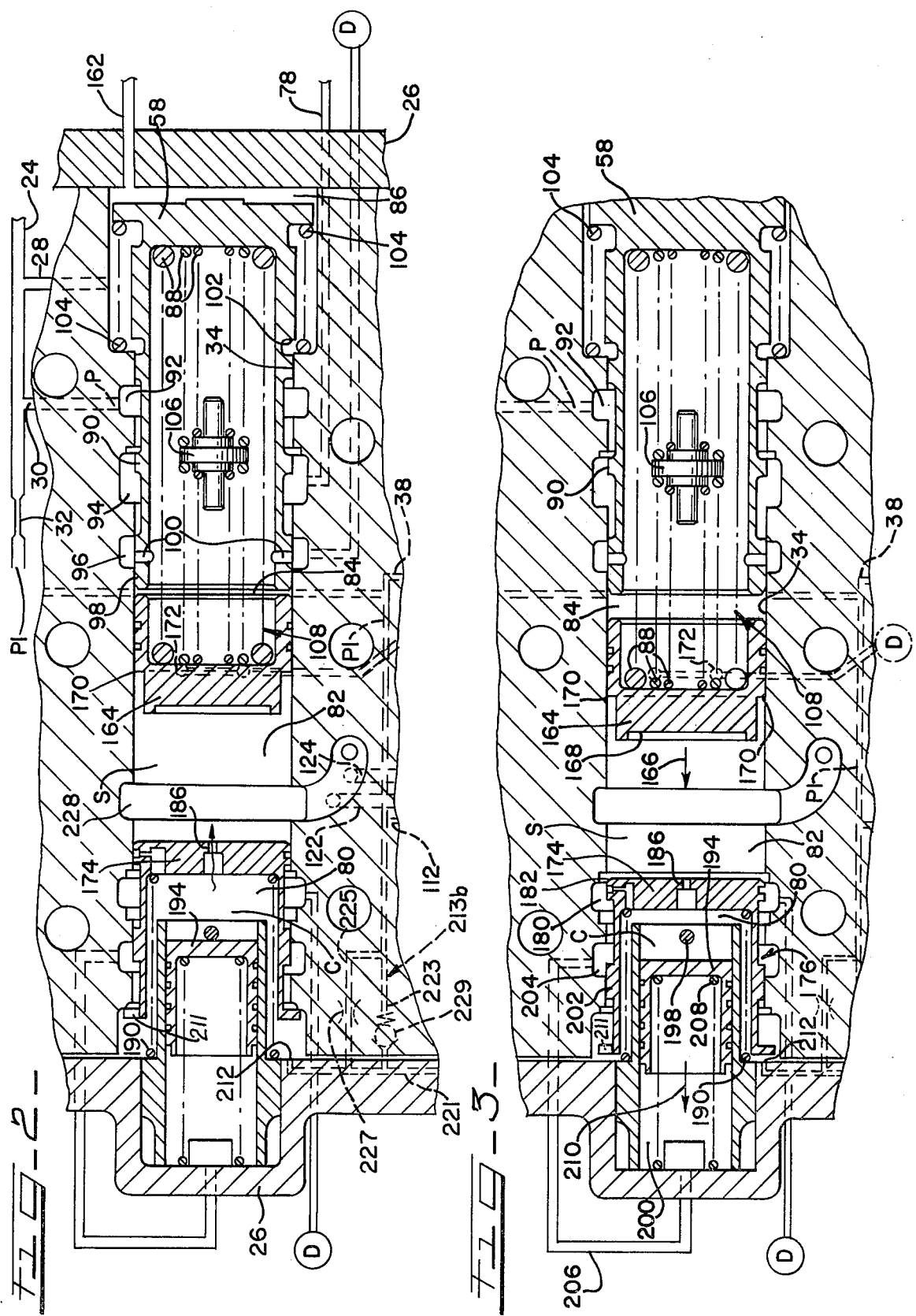

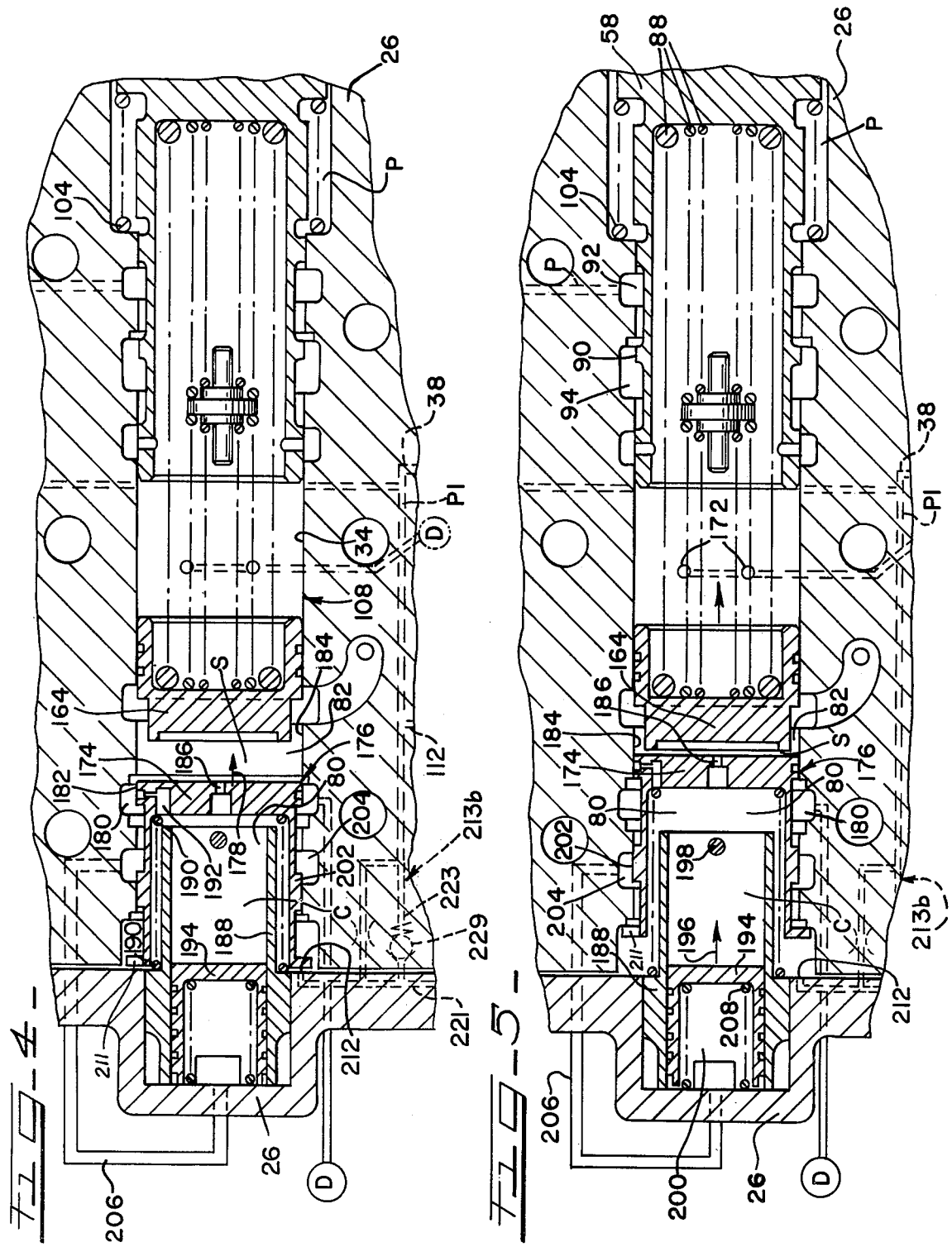

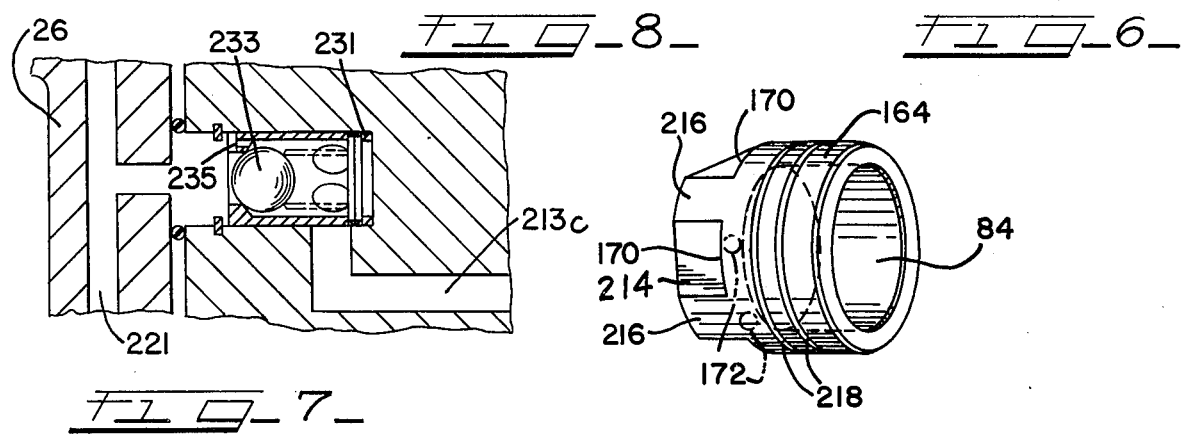
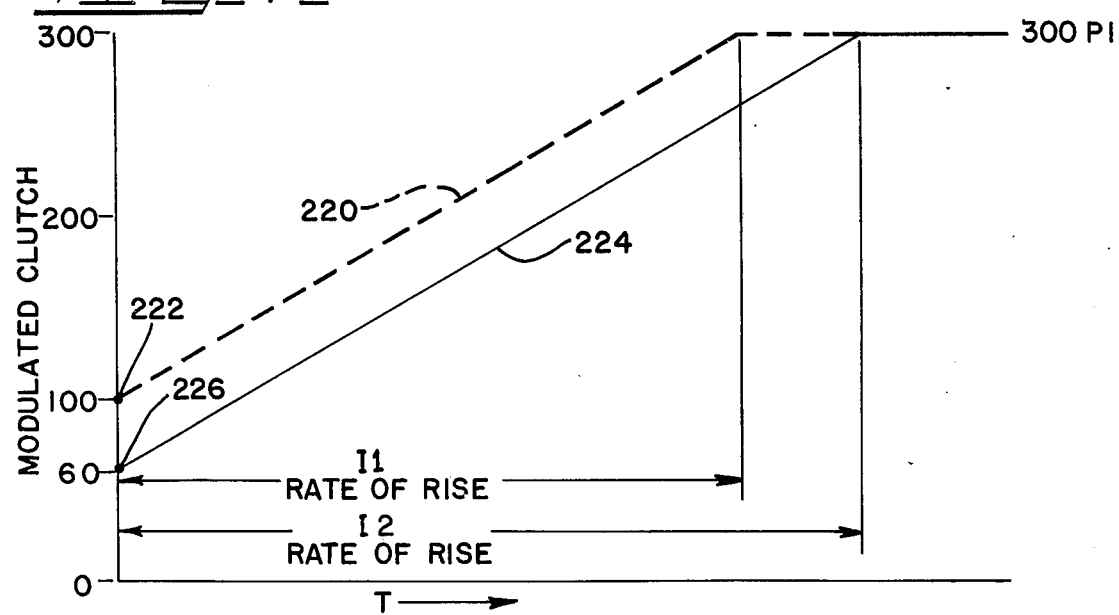
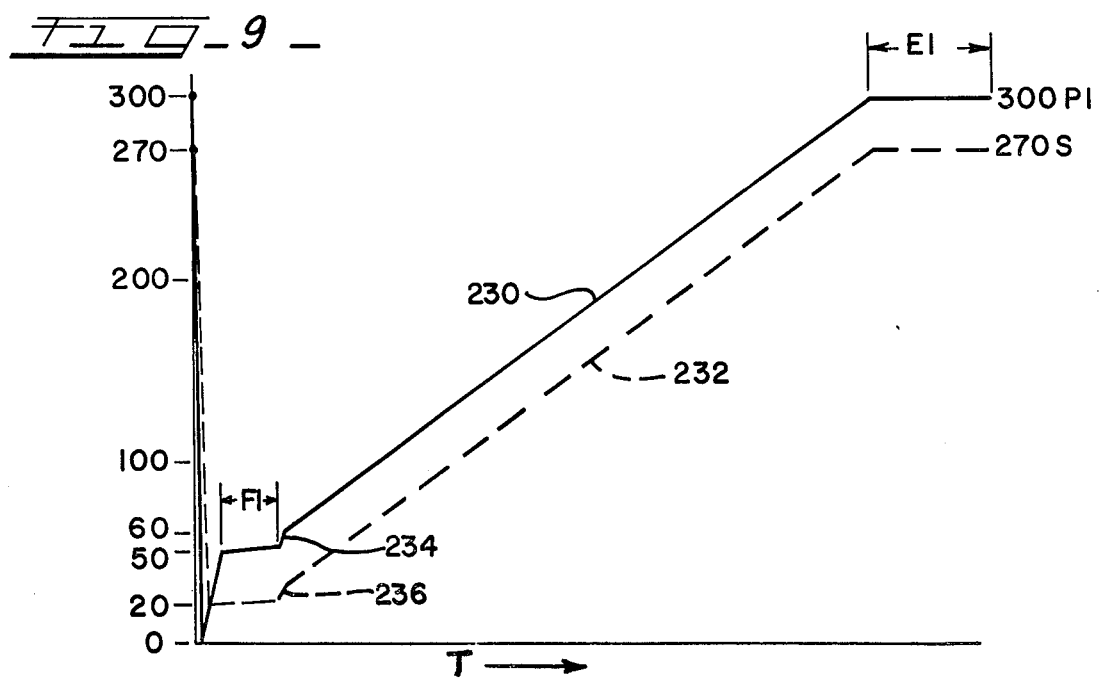

TRANSMISSION CLUTCHES WITH FULLY-RESETTING MODULATOR-LOAD-PISTON

This application is a continuation in part of U.S. Pat. No. 693,469, filed June 7, 1976, now abandoned and owned by the same assignee.

The present invention relates to hydraulic controls for smoothly effecting shifting of a vehicle transmission of the type in which the shifting power is provided by hydraulic pressure applied in the transmission itself, i.e., to effect a smooth power-shift.

It more specifically relates to a multi-functioning hydraulic transmission control circuit including interacting valve mechanism parts which, in response to a shift being called for in a clutch-cylinder-controlled multi-speed transmission, inaugurate a fill pressure flow to the clutch cylinders concerned, prior to the subsequent fluid pressure rise effected therein; thereafter, upon completion of the fill, the parts modulate pressure rise of the hydraulic clutch fluid from and at approximately actual clutch fill pressure up to, and remaining at, the final pressure of engagement.

The above parts, which shift position either directly or indirectly in response to position changes made to a transmission shift lever by an operator, comprise 1st speed selector and 2d direction selector valve spools connected to the transmission clutch cylinders to direct valve fluid output thereto selectively, and also 3d dump valve, 4th a load piston, 5th another piston, 6th a modulator valve, and 7th interacting spring parts collectively providing said directed valve fluid output, all in a bore common thereto, and arranged therein with the dump valve part confronted at one side by the other piston part, 5th above, so as to define mutually therewith a differential pressure chamber in the bore, and confronted at the other side by a first side of the load piston part so as to define mutually with that first side a signal pressure chamber in the bore, and with an opposite side of the load piston part spacedly confronting the modulator valve part so that they mutually engage therebetween the interacting spring parts, 7th above, in the common bore.

According to past transmission practices in tractors and other vehicles in connection with controlled rate of rise valve assemblies each including a modulator valve and an associated load piston therefor, the speed and direction clutches provided in the transmission have been operated through the controlled rate of rise valve assembly to cushion clutch engagement. In tractor transmissions affording multi-speed ranges both forward and reverse, it is neither necessary nor desirable that the pressure rise be as gradual in other transmission speed settings aside from the high torque, first speed which tends to engage jerkily, and a transmission works at a disadvantage without having a lesser and a least gradual pressure rise afforded during respective second and third speed upshifts. And all the more it is a disadvantage that the rate of rise valve assembly is hydraulically spaced a long distance away from the transmission controlled thereby so that the valve assembly in a sense operates too remotely from, and altogether ignorantly of, the actual clutch fill pressure existing in the transmission itself. The latter disadvantage manifests itself in the functioning of the modulator valve and load piston in some cases, with the load piston never fully resetting itself, whereupon the subsequent fluid pressure rise starts at a point appreciably higher than actual clutch fill pressure in the transmission itself and so no smooth, gradual shift results.

According to my invention, the foregoing disadvantages and drawbacks are materially reduced in severity if not eliminated altogether, because the functions including full resetting of the parts at the beginning of each shift, and a lesser and a least gradual pressure rise afforded during respective second and third speed upshifts, are all accomplished by and among the novelly coacting parts hereinabove enumerated. One preferred way for such accomplishment resides in the present provision of a simulated clutch piston serving in the rate of rise valve assembly as the other piston, 5th above, and in the present provision of an orificed bore housing progressively opened between the speed selector valve spool, 1st above, and the signal pressure chamber in the aforesaid common bore, all as will now be explained in detail. Features, objects, and advantages will either be specifically pointed out or become apparent when, for a better understanding of the invention, reference is made to the following description taken in conjunction with the accompanying drawings which show a preferred embodiment thereof and in which:

FIG. 1 is a schematic showing of a three speed forward, three speed reverse transmission and hydraulic power control system therefor, with the rate of rise valve assembly of the present invention forming part of the control system shown;

FIGS. 2, 3, 4, and 5 are all enlarged cross sectional views of the rate of rise valve assembly of the invention, the same as appears as a detail in FIG. 1 and with the components shown in FIGS. 2-5 in the various operating positions specified under appropriate subheadings hereinafter;

FIG. 6 is an isometric view of an hydraulic load piston appearing in longitudinal cross section in each of the foregoing figures;

FIG. 7 is a graphical representation of a portion of pressure traces desirably and undesirably associated with the operation of the control system foregoing;

FIG. 8 shows a flow-check valve as used in the invention, in actual practice; and FIG. 9 is a graphical representation of complete pressure traces associated with the operation.

More particularly in the drawings, a reversible transmission 10 controlled in accordance with my invention is shown in FIG. 1 having three speeds in the forward range and three speeds in the reverse range. The transmission 10 has hydraulically operated, clutch units controlled first by a piston and cylinder 1, and similarly by 2, 3, F, and R for power shift operation. In one of the standard ways, the clutch units controlling 1, 2, and 3 speeds are in the forward section of gearing, whereas the units controlling direction F-R are in the output section of the transmission 10.

Located forwardly of the transmission 10 are an engine driven hydraulic pump 12, and an engine driven torque converter 14 coupled to the transmission 10 to provide torque-amplified input thereto.

Hydraulic drainage from various drains denoted D is collected in a transmission sump 16, from which it is drawn through a pump intake line 18 into the inlet side of the hydraulic pump 12. From its pump output side, the pump 12 discharges hydraulic fluid through an outlet line 20 and a filter 22, thence into a pump pressure line 24 at pressure P.

Pump line pressure P enters a rate of rise valve assembly housing 26 through a modulating pressure chamber conduit 28, through a modulated bore core conduit 30, and through a rate of rise valve modulation bore restriction which is a large, fixed clutch-fill 32 forming a separate part of a rate of rise valve assembly modulation bore 34 and feeding valve output pressure P1 into a housing tee 36.

The tee 36 on the downstream side of the modulation bore restriction 32 splits into lower and upper branches as viewed in FIG. 1. Hydraulic fluid under a valve modulated first output pressure P1 flows through the lower branch into a speed valve output connection 38. In the upper branch, hydraulic fluid originally under pressure P1 is supplied to a direction valve output connection 40 at a valve modulated second pressure P2 by way of a neutralizer valve bore 42 occupied at one end by a neutralizer valve spool 44.

In the valve housing 26, in a speed valve bore 46 interposed in the speed valve output connection 38, a three-position speed valve spool 48 is reciprocally positioned by the operator to selectively supply valve modulated first output fluid to a set of individual speed lines 50 leading to each one of the pistons and cylinders 1, 2, 3 of the clutch units in the forward section of the transmission 10. Each line 50 is a long one and, due to friction and restriction therein, the actual clutch pressure PA of the clutch units will be substantially less than the valve modulated first output pressure P1.

Similarly, in a direction valve bore 52 interposed in the direction valve output connection 40, a three-position direction valve spool 54 is reciprocally positioned by the operator to selectively supply valve modulated second output fluid at pressure P2 to a pair of individual direction lines 56 leading to pistons and cylinders F, R of the clutch units in the output section of the transmission 10. Due to hydraulic friction and restriction in each of the direction lines 56 which afford a long and somewhat tortuous path to flow of hydraulic fluid therein, actual pressure PA in the piston and cylinder F and in the piston and cylinder R will be substantially less than the pressure P2 in the direction valve output.

TORQUE CONVERTER — FIG. 1

In the operation of the hydraulic system for torque amplification, hydraulic fluid keeps the torque converter 14 filled, being arranged with its supply of fluid provided by a rate-of-rise-pressure modulating valve 58 located in the right end of the rate-of-rise valve assembly modulation bore 34, and with its back pressure maintained by a torque converter regulator valve spool 60 reciprocal in the left end of the neutralizer valve bore 42. More particularly, a back pressure land 62 on the spring seated spool 60 is operatively located between a second core groove 64 and a first core groove 66 connected to a converter outlet line 68. As hydraulic pressure rises between the end of the spool 60 and the left end of the bore 42 against which it is seated, the spool 60 moves rightwardly in response to this increasing converter back pressure, and the intervening land 62 thereon opens and intercommunicates the first bore groove 66 and the second bore groove 64, which latter discharges the excess hydraulic fluid therefrom through a cooler inlet line 70, an hydraulic torque converter cooler 72, a cooler outlet line 74, and a housing oil gallery 76, thence into a transmission lube system L and ultimately into the transmission sump 16.

The rate-of-rise-pressure modulating valve 58 and a torque converter inlet line 78 provide a direct connection between the modulated bore core conduit 30 and the torque converter 14 on its inlet side. More particularly, in the rate of rise valve assembly modulation bore 34, which bore is divided into the respective differential pressure chamber 80, signal pressure chamber 82, spring chamber 84, and modulating pressure chamber 86 as viewed in that order from left to right in FIG. 2, the modulating valve 58 is of piston shape and arranged with the piston end hydraulically separating the spring chamber and modulating pressure chamber 84 and 86 in the bore 34.

At the times while it is maintaining the system under full clutch engaging pressure, the modulating valve 58 occupies an intermediate open position as shown in solid lines in FIGS. 1 and 2, having been moved by pressure in the modulating pressure chamber 86 to a point where the hydraulic pressure is exactly equal to and balanced by a partially compressed spring group 88 pressing against the inside of the valve piston end. In that intermediate position shown, a regulating valve land 90 maintains the pump pressure P in a bore core 92 by controlling flow of excess fluid into a bore core 94 thence to the torque converter (not shown in FIG. 2) through the torque converter inlet line 78. Additional pressure encountered in the modulating pressure chamber 86, as due to stiff, very cold oil, will bring about progressive leftward opening movement of the valve 58 causing cooperation between a bore core 96 connected to drain D and a dual function dump land 98 on the valve 58. The dump land 98 has a valve edge with a first function whereby oil from the cores 92 and 94 will go directly to the bore core 96 and drain D, at least until the oil warms up in the system. The dump land 98 also has ports 100 performing the second function, in all positions of the valve 58, of continuously venting the spring chamber 84 to drain D by way of the core 96. A shoulder 102, formed on the valve 58 adjacent a valve seating sping 104, engages the fixed seat for spring 104 and limits progressive valve opening movement to a relatively short amount of overall valve travel.

An intermediate guide and seat 106 aligns inner ones of the springs of the spring group 88 which are connected thereby to act in tandem within the spring chamber 84.

The spring group 88 and associated parts within the rate of rise valve assembly modulation bore 34 form a rate of rise valve assembly generally indicated at 108 and described in detail shortly.

SPEED VALVE — FIG. 1

When the spool 48 in the speed valve bore 46 is detented at 110 in the first or 1 speed position as shown in solid lines, the speed lines 50 to the respective piston and cylinder units 2 and 3 are connected by the spool 48 in readily discernible paths to drain D; at the same time from the output connection 38 in which the speed valve is located, the valve modulated first output pressure P1 through a short conduit 112 is admitted by an open spool land 114 into an individual speed line 50 and the clutch piston and cylinder 1 so as to prepare the transmission 10 for first speed drive.

Progressive inward movement of the speed valve spool 48 rightwardly so as to assume an intermediate or 2 position, causes the piston and cylinder 1 and 3 to be connected by the spool 48 to drain D; at the same time valve modulated first output pressure P1 from the output connection 38 and a core groove 116 is admitted by an open spool land 118 into the appropriate speed line 50 thence into piston and cylinder 2 to prepare the transmission 10 for second speed drive. Also at the same time, a second branch source of the fluid system output is opened under pressure P1 to supply fluid therefrom to the signal pressure chamber 82; more specifically, spool land 120 uncovers the mouth of a first auxiliary passage 122 interconnecting the short output conduit 112 and the signal pressure chamber 82 so as to provide a first supplement to the flow of fluid in the latter for a reason later to be disclosed. That same spool land 120 upon further depression of the spool 48 to extreme rightward position corresponding to speed 3, uncovers the mouth of a second auxiliary passage 124 between the short output conduit 112 and the signal pressure chamber 82 to afford a second supplement to the flow of hydraulic fluid into the latter.

When the spool 48 is fully depressed rightwardly for the speed 3 condition, the clutch piston and cylinder units 1 and 2 are connected to drain D; at that time, the spool land 120 uncovers and leaves open a core groove 126 to pressure P1 in the short output conduit 112, so as to pressurize the clutch piston and cylinder 3 and prepare the transmission 10 for speed 3 condition.

DIRECTION VALVE — FIG. 1

When the spool 54 in direction valve bore 52 is detented at 128 registering at position F for forward drive as shown by solid lines, the valve modulated second output pressure P2 which enters a core groove 130 and direction valve bore 52 is directed by a spool land 132 into the appropriate individual direction line 56 and introduced by the latter into the piston and cylinder F to complete forward drive in the transmission. The individual line 56 to the clutch piston and cylinder R is meantime connected by the spool 54 in a path leading through the hollow core 134 of the latter, past the detent 128, and thence to drain D in the transmission 10.

When the direction valve spool 54 is partway depressed into an intermediate position corresponding to N to neutralize the transmission 10, the pressurized core groove 130 of direction valve bore 52 is blocked off by the spool land 132 and by an adjacent land 136, whereas both direction lines 56 are connected to drain D is discernible direction valve paths in FIG. 1. So the direction clutches are disengaged and no drive is transmitted through the transmission 10.

Finally upon full depression of the spool 54 into its extreme position corresponding to the R condition of the transmission for reverse, the spool land 136 directs pressure P2 from the core groove 130 into a core groove 138, whence it goes through the appropriate direction line 56 into the clutch piston and cylinder R, completing the reverse path through the transmission 10. At the same time, the direction line 56 to the clutch piston and cylinder F for forward drive is connected by the spool 54 in a path including the hollow core 134, past the detent 124, thence to drain D so as to keep the transmission forward drive inactive.

NEUTRALIZER — FIG. 1

The neutralizer valve spool 44, which in a rightward position has a condition of repose as shown, and which has a controlled, shifted position to the left as viewed in FIG. 1, is under the electro-hydraulic control of a brake operated, transmission neutralizer contacts component 140, an electric neutralizer valve solenoid 142, and an hydraulic neutralizer valve component 144, all forming parts of a three-way cartridge solenoid valve assembly generally indicated at 146. The valve assembly 146 is in turn controlled by the vehicle brake pedal 148 in a way automatically to neutralize the transmission 10 at all times during which the vehicle brakes are applied.

During normal vehicle running conditions, the neutralizer valve spool 44 occupies its rightward or repose position, and so do the brake pedal 148 and valve assembly 146, all as shown in solid lines in FIG. 1. During such condition of repose, a spool groove 150 on valve spool 44, a spool groove 152 on valve component 144, and an interaction spring 154 between the torque converter regulator valve spool 60 and the neutralizer valve spool 44 urging them to seat in opposite ends of the bore 42, are performing as follows. The spool groove 150 completes an hydraulic path between the housing tee 36 and direction output connection 40; therefore, the valve modulated first and second output pressures P1 and P2 are equal to one another, enabling the selected ones of the speed and direction clutches to remain operative so that the transmission 10 stays engaged. The spool groove 152 completes an hydraulic path leading from the end of the bore 42 occupied by the corresponding end of the neutralizer valve spool 44, through a neutralizer valve line 156, thence into the groove 152, and pair of series connected drain lines 158 and 160 leading to drain D in transmission 10. So the unopposed spring 154 holds the neutralizer spool 44 in its unshifted position of repose as shown in solid lines in FIG. 1, allowing the transmission 10 to continue to drive.

However, depression of the brake pedal 148 into the broken line position show, not only applies the vehicle brakes by conventional means, not shown, but also moves a switch arm counterclockwise as viewed in FIG. 1 closing the transmission neutralizer contacts component 140 and setting the transmission 10 in neutral. More particularly, contact closing in the battery solenoid circuit illustrated electromagnetically causes the valve solenoid component 142 to rise as viewed in FIG. 1 and to shift upwardly the spool groove 152 therewith. Therefore, the modulating pressure chamber 86 at pressure P is interconnected by way of a pressure line 162 with the spool groove 152, and at the same time the neutralizer valve line 156 is connected with the same spool groove 152, thus pressurizing that end of the valve bore 42 which is occupied by the corresponding end of the neutralizer spool 44.

Accordingly, against the resistance of spring 154, the neutralizer spool 44 is pressure actuated under pressure P into its shifted position, to the left as viewed in FIG. 1; the neutralizer spool groove 150 interconnects the direction valve output connection 40 and drain D, whereas pressure P1 from the housing tee 36 is blocked off by the main portion of the neutralizer spool 44. Hence, the F-R direction clutch units are disengaged, interrupting the transmission of power in transmission 10 always contemporaneously with brake application. So the vehicle brakes stop motion or arrest motion of the vehicle to the degree desired, without having to overcome traction power of the engine as well.

RATE OF RISE VALVE ASSEMBLY — FIG. 3

Forming part of the rate of rise valve assembly 108, a load piston 164 is controlled by hydraulic pressure of signal pressure chamber 82 and by mechanical pressure of the spring group 88 either to perform a resetting stroke in the bore 34 in the direction of an arrow 166, and to perform a loading, opposite reciprocal stroke to the right as viewed in FIG. 3. The piston 164 has a crown head which is formed with a shallow central recess 168 and which is subject to signal pressure S, and has the spring group 88 seated inside the head so as to interact with the modulating valve 58 by reacting thereagainst and loading it for the desired rate of rise modulation.

About the load piston 164, a uniplanar ring includes four spaced apart control edges 170 that establish cooperation with two drain connected bore ports 172, which ports are in the path of reciprocation of the piston 164 and which are uncovered by the control edges 170 during piston movement to the right as viewed in FIG. 3.

Thus during its loading stroke the load piston 164 will stop moving to the right at the point where it uncovers drain ports 172, because the activating pressure S thereon starts being vented to drain at 172; whereas its opposite travel for resetting in the direction of the arrow 166 is limited as the piston 164 stops immediately upon contact with, or in practice just short of, the dump valve 174 of an adjacent signal pressure control assembly 176.

DUMP VALVE — FIG. 4

As viewed in FIG. 4, the dump valve 174 will be appreciated to have primary control over the emptying and filling of chamber 82. That is, leftward movement of the dump valve 174 opposite to the direction of an arrow 178 will vent the signal pressure chamber 82 through a bore core 180 to drain, tending to empty the chamber. But movement of the dump valve 174 in the direction of the arrow 178 causes a sealing edge 182 thereof to seal off an adjacent land 184 in the bore 34 and allow a constant differential, constant flow, timing orifice 186 fixed in the center of the dump valve 174 to fill the signal pressure chamber 82. The dump valve cavity pressure C within the differential pressure chamber 80 causes essentially one way flow through the fixed orifice 186.

Within the dump valve cavity, a sleeve 188 is fixed and provides the seat for a light spring 190 urging the dump valve 174 to its sealed closed position in the direction of the arrow 178. The head of the valve 174 incorporates a pressure equalizing groove formation 192 to keep the valve centered and free from binding.

CLUTCH FILL PISTON — FIG. 5

Within the fixed sleeve 188 of the signal pressure control assembly 176, a simulated clutch fill piston 194 is reciprocally mounted to move rightwardly in the direction of an arrow 196 to an extreme position limited by a cross pin 198 fixed in the rate of rise valve assembly housing 26, or to move leftwardly opposite to the arrow's direction and bottom itself against the adjacent portion of the housing 26.

The dump valve 174 is in sole control of directing fluid to fill and to empty the piston cavity 200 of piston 194. In the valve-closed position of the dump valve 174 as shown in FIG. 5, a dump valve land 202 diverts valve cavity pressure C from the differential chamber 80 through a bore core 204 leading to the back of the piston, thence into a passage 206 and the piston cavity 200. Pressure is thus equalized across the piston 194 enabling a light spring 208 inside the head of the piston to move the latter on a complete resetting stroke in the direction of the arrow 196. But when the dump valve 174 is in the dump position to the left of the position shown in FIG. 5, the land 202 vents the bore core 204 through the bore core 180 to drain D, enabling the valve cavity pressure C of the differential pressure chamber 80 to overcome the light spring 208 and force the piston 194 leftwardly as viewed in FIG. 5 on a complete control stroke.

STEADY STATE CLUTCH ENGAGEMENT — FIG. 2

C is equal to P1, P1 is equal to P, and P is 30 psi greater than pressure S, according to this dynamic equilibrium condition as shown here. The condition can be accurately mechanically set, in view of the spring chamber 84 always being maintained in drain pressure condition, in view of the flow through the rate of rise valve modulation bore restriction or clutch fill orifice 32 being inconsequential when the clutches are fully engaged, and in view of the strategic placement of the spring group 88 in the spring chamber and of the valve seating spring 104 engaging the head of the rate of rise pressure modulating valve 58.

More particularly, in spite of smallness or the magnitude of flow in the direction of the arrow through the restrictive timing orifice 186, the spring group 88 is precisely calibrated so that the active one of the four control edges 170 will restrict outflow from the bore ports 172 constituting drain holes to the same restricted rate, thus maintaining the signal pressure S in chamber 82 at a constant regulated value, e.g., 270 psi (18.4 Atmos.). On the other hand, the valve seating spring 104 which is precalibrated to a moderate value, such as the equivalent to 30 psi, will act in conjunction with the same spring group 88 having the equivalent of 270 psi (18.4 Atmos.) pressure, to cause rate of rise pressure modulating valve 58 to regulate by means of the valve land 90 thereon with the total of 300 psi (flat curve segment at level of and adjacent "300 P1", FIGS. 7 and 9, equivalent to 20.4 Atmos.) as the pressure P. Because as noted, P equals P1 equals C, cavity pressure C in the differential chamber 80 will maintain constant flow through the restricted fixed orifice 186 creating the 30 psi pressure drop consistent with the signal pressure S remaining at 270 psi (18.4 Atmos.).

The restrictive flow through the timing orifice 186 making its way out the drain holes 172 plus the regular leakage in the selected clutch of each of the two clutch groups totals a relatively minor flow in terms of the clutch fill orifice 32 which generates a barely perceptible pressure drop thereacrosss.

DUMP, INITIATING CLUTCH FILL — FIG. 3

Fill time is so comparatively short in a shift cycle of the transmission, that the problem is to reduce the dump valve cavity pressure C to a low point and in turn reduce the signal pressure S to a low point, such that the resetting load piston 164 moving in the direction of the arrow 166 will be able fully to complete the resetting stroke before the fill portion of the clutch cycle can elapse. The complicating aspect is that the pressure P1 of the valve output fluid which restrictively enters the dump valve cavity of which the pressure is C, must have a value of about 50 psi in order that, at the clutch itself, the effective pressure PA actually filling the clutch will be about 20 psi. The tendency which therefore must be overcome is that the signal pressure S will be too high when, preferably, it should be at or about actual clutch fill pressure of 20 psi so as not unduly to oppose full reset of the load piston 164.

In approaching the present solution to the problem, let it be assumed a shift is being made with the transmission in first gear, and with a change in the direction clutches, e.g., from reverse R to forward F. Hence, the clutch piston and cylinder unit 1 will remain filled whereas the clutch piston and cylinder unit F, not shown, will be empty and require complete filling. So all pressures in the system will drop drastically because 20 psi actual clutch filling pressure is all that is required by the empty clutch piston and cylinder.

P is 10 psi (0.7 Atmos.) greater than P1, P1 is equal to P2, P2 is 30 psi (2.0 Atmos.) greater than S, S is equal to C, and C is equal to actual clutch fill pressure PA (20 psi or 1.4 Atmos.), according to the condition illustrated in this figure, with substantial flow through the large clutch fill orifice 32 creating a 10 psi (0.7 Atmos.) drop therein because of the large volume of fluid temporarily going therethrough. A glance for the moment back at FIG. 1 and specifically at extended-length direction lines 56 will make it clear how fluid from direction valve spool 54 can drop 30 psi (2.0 Atmos.) in pressure from P2 to the actual clutch pressure PA by the time it arrives at the selected clutch piston and cylinder unit F.

The cascading drops in pressures PA, P2 and P1 due to empty piston and cylinder unit F on the line, and the drop in cavity pressure C due to the precipitous drop of the valve modulate first output pressure P1, results in the residual 270 psi (18.4 Atmos.) signal pressure S forcing the dump valve piston 174 in the direction of an arrow 210 in FIG. 3 to the open position causing two coordinated actions. First, the dump valve control edge 182 opens a path from signal pressure chamber 82 through bore core 180 to drain D, reducing the signal pressure S to about 20 psi and allowing the load piston 164 under force of the spring group 88 to reset leftwardly in the direction of the arrow 166. Second, the dump valve land 202 vents fluid from the piston cavity 200 and the passage 206 from the back of the piston and bore core 204, through the bore core 180 thence to drain D, enabling the approximately 20 psi cavity pressure C to move the piston 194 in the leftward direction of the arrow 210 against the minor resistance of the light piston spring 208.

So, contemporaneously with clutch fill, the simulated clutch fill piston 194 makes a complete control stroke, enlarging the volume of the differential pressure chamber 80 at a fairly steady rate against the opposition of the light spring 208 within the piston head. At the same time fluid flow in the valve output connection 38 at pressure P1 will enter the differential pressure chamber 80, through appropriate admission means such as through a hole 212 at the back of the dump valve 174. As a matter of practice, the cavity pressure C and the signal pressure S are substantially equal, with the latter pressure S (about 20 psi) being only enough the higher of the two by the minor amount necessary to keep the light valve spring 190 under compression and the dump valve 174 hydraulically held open throughout clutch fill. Flow at this time through the timing orifice 186 is essentially zero.

Under the favorable clutch fill condition just outlined, the load piston 164 will execute a complete resetting stroke contemporaneously with only the major first portion of clutch fill time, balanced against the existing 20 psi signal pressure, the spring group 88 will relax except to the extent of transmitting an equivalent of 20 psi (1.4 Atmos.) pressure, and the modulating valve 58 will be modulating the line pressure P in the range of 50 psi (the curve segment identified by the length of fill interval "FI", FIG. 9, equivalent to 3.4 Atmos.) or 60 psi (4.1 Atmos.) or so.

MOTION TO END FILL — FIG. 4

Toward the end of clutch fill, the load piston 164 is shown in this figure to have taken its extreme position of full reset and, occurring at or just after clutch fill, the simulated clutch piston 194 will according to this showing have completed its control stroke. Inherently with the ending of clutch fill, flow through the clutch fill orifice 32, not shown, drastically reduces, the pressure drop thereacross disappears, and the valve modulated first output pressure P1 and second output pressure P2 increase about 10 psi immediately (along curve segment 234, FIG. 9) to the pump line pressure of, say, 60 psi. The dump valve 174 in its open-dump position illustrated becomes mechanically and hydraulically unbalanced from the spring force at 190 as augmented by the rise in pressure to 60 psi (4.1 Atmos.) in the P1 connected hole 212 leading to the back of the valve 174. The valve 174 at end of fill therefore shifts out away from the adjacent end of bore 34 as closed by housing 26 and to the right in the direction of the arrow 178 into the closed-seated position, causing two actions.

First, the dump valve land 202 immediately equalizes pressure across the simulated clutch piston 194, bypassing from the back of the piston 194, through the line 206 and bore core 204, through the gap past a stop tang 211 on the end of the valve, through the space between the valve 174 and the fixed sleeve 188, and thence into the differential pressure chamber 80 to which the head of the piston 194 is exposed. Second, the valve sealing edge 182 seals off the drain bore core 180 from the signal pressure chamber 82 and, via a fill path including the timing orifice 186 forming a first means of connection to the signal pressure chamber, flow of fluid commences from the differential pressure chamber 80 into the lower, 20 psi pressure S of the signal pressure chamber 82, to increase pressure S. So by this means, a first branch source of the fluid system output leading from connection 38, via an interconnection such as an interconnecting housing connection 213a (FIG. 1), and chamber 80 supplies the signal pressure chamber 82 in the indicated way through orifice 186 (FIG. 4).

Immediately, hydraulic pressure on the load piston 164 will make its presence felt by moving the latter rightwardly as viewed in FIG. 4, so as to establish starting pressure for the desired pressure rate of rise in the affected clutch, as can be understood from FIG. 5.

RATE OF RISE, STARTING PRESSURE — FIG. 5

With the valve parts in position as illustrated for this condition, the unopposed light piston spring 208 will start the simulated clutch fill piston 194 in the direction of the arrow 196 to reset the piston against the stop pin 198. Also, the rising signal pressure S will about simultaneously start the load piston 164 in the direction of the adjacent arrow on its load stroke.

At outset of movement of the load piston 164 on its load stroke, compression will increase in the relatively relaxed spring group 88, communicating itself to the modulating valve 58 and causing the valve land 90 to commence restricting outflow from the bore core 92 which carries pump line pressure P. There thus begins a linear rise of pressure P and, proportionately, a linear rise of the pressures P1, P2, S, C, and PA.

Therefore, as the piston 194 in FIG. 5 completes its resetting stroke and the load piston 164 completes its load or control stroke, the spring 104 maintains a continuous 30 psi differential of the linearly rising pressures C, P1, and P2 (curve segment 224, FIG. 7, and curve segment 230, FIG. 9) above signal pressure S, the differential pressure across the timing orifice 186 remains constant at 30 psi, the flow rate through the orifice 186 remains constant throughout the pressure rate of rise, and the rate of movement of the piston 164 stays constant throughout the linear pressure rise, which occurs at constant rate for each load or control stroke of the piston 164. That is to say, for a given stroke the rate of rise of pressure does not change although the rate for one stroke may differ from other strokes for reasons hereinafter set forth.

LOAD PISTON — FIG. 6

The referred to uniplanar four spaced control edges about the crown of the load piston 164 form part of eight consecutive outside portions thereof, alternate ones of which are the same flats 214 defining the sealing control edges 170, and each remaining one of which is a land 216 retaining its original cylindrical shape and being identical to the other three lands.

The four sealing edges 170 control the bore ports 172 constituting drain holes and, in practice, the drain holes as superimposed in FIG. 6 subtend a central angle slightly in excess of the arcuate width, measured in a circumferential direction, of each of the lands 216. Irrespective therefore of the rotative position of the load piston 164 in bore 34, not shown, one sealing edge 170 will have a bore port 172 aligned in its path of reciprocation so that, by unblocking same, the sealing edge 170 concerned will determine the end of travel of the load piston 164 on each load stroke at the same point essentially.

Hydraulically balancing or centering grooves 218 are formed at spaced locations in the exterior of the load piston 164 adjacent its open end.

RATE OF RISE CURVES — FIG. 7

Without provision for my novel arrangement just described, clutch pressure at the end of fill can be substantially high due to incomplete recycling of the load piston, not shown, as illustrated by the broken line rise curve 220 in this figure. That is to say, the end of fill point 222 on the curve 220 represents a residual 100 psi (6.8 Atmos.) pressure, and the modulated rate of rise will thus start off at too high a level to effect clutch engagement properly. Under my novel arrangement, however, the load piston is ready for a complete control stroke at the point close to, but always after, clutch fill when the dump valve shifts to the right and the simulated clutch piston starts resetting movement back to its starting position; then, the rate of rise proceeds in the desired way along the solid line rise curve 224. The end of fill point and piston bottoming are shown for convenience as coinciding at 226 on the curve 224 and that point represents the desired 60 psi (4.1 Atmos.).

SPECIAL APPLICATION — FIG. 1

In one physically constructed embodiment of the invention, the rate of rise valve 58 had a design of substantial size to be useable with transmissions of the larger commercial sizes. For application to such larger sized transmissions, which can be considered a special application, the connection 213a is shown in FIG. 1 as a single-leg conduit component, which properly handles both egress an ingress of fluid for the respective open-dump and closed-seat directions of movement of the associated dump valve 174. So no restriction means are additionally necessary or auxiliary fluid handling means are additionally necessary in controlling speed of movement of the dump valve 174. Therefore, the third branch source of system fluid output for chamber 80 as illustrated in FIG. 1 is unnecessary, and a valve 48 to chamber 80 interconnection 221 as shown in the housing 26 can readily be eliminated, preferably so.

GENERAL APPLICATION — FIG. 2

When a design of a rate of rise valve 58 of such substantial size mentioned is applied more generally, suitable as well for smaller transmissions having quickly filled, small clutch cylinders, the length of the time periods during a shift cycle are necessarily altered; the sequences change phase somewhat and certain structural modifications are found to prove beneficial.

As an example, the selected clutch cylinder comparatively fills very fast, with the result that the modulation bore restriction flow at 32 stops relatively prematurely and the first output pressure P1 quickly rises about 10 psi (0.7 Atmos.) to reach the pump line pressure P at which the pressure P1 stays. Such pressure fluctuation occurs with the load piston 164 still resetting itself and with the clutch simulating piston 194 still negotiating and being only part way along in the direction (leftwardly as viewed in FIG. 2) of its control stroke. So the fill cycle in effect continues for a while as the simulated clutch piston 194 and piston 164 keep moving, even though the clutch itself is already filled.

Also, without the structural modifications referred to, the dump valve will tend to move fairly unrestrainedly to the closed-seated position immediately upon termination of the fill cycle as caused when the simulated clutch piston 194 bottoms out at end of its control stroke. At that point, essentially where modulation starts, the signal pressure S will tend to undergo an unwanted pressure rise of the order from perhaps 45 psi (3.1 Atmos.) to 65 psi (4.4 Atmos.) rather abruptly; in a smaller vehicle equipped with a smaller transmission as referred to, the start-up of the vehicle from a stopped position will sometimes be less smooth than desirable, because of a consequent slight jerky clutch engagement.

Accordingly, as modified for the more general purpose application, the interconnecting housing connection 213b is illustrated as a two-leg conduit component in FIG. 2, wherein a lower leg 223 thereof is shown hydraulically in parallel with an upper leg 225 incorporating a calibrated restriction 227. Then at or about the outset of modulation as determined by the bottoming out of simulated clutch piston 194, the comparatively slow, thus restricted flow from the first branch source of the connection 38 to the differential chamber 80 will more gradually move the dump valve 174 to the closed-seated position and thus impart a rise in pressure S of only the order from perhaps 45 psi (3.1 Atmos.) to only about 50 psi (Atmos.); regular modulation then raises the pressure linearly and the vehicle starts up without discernible jerk, in the desired way.

The restriction 227 necessitates two minor adjuncts as preventatives.

One adjunct is the housing connection 221 to prevent the problem of the dump valve 174 floating and sometimes failing to complete its closed-seated stroke when vehicle direction changes are made in 2d or 3d gear setting. My solution is that the connection 221 on one side and the connection 122 on the other side of the dump valve 174 tend immediately to equalize the pressures fed thereto by the speed valve 48 (not shown) when in 2d or 3d gear, so that the dump valve spring 190 will unopposedly cause the dump valve to continue its movement once started, into the closed-seated position as desired. The equalization is brought about because the speed spool land 120, on reaching speed 2 position or passing therethru to speed 3 position, uncovers the mouth of the connection 221 at the same time at which, and in the same way in which, it uncovers the mouth of the first auxiliary passage 122 as previously described.

The other adjunct, appearing in the lower leg 223, is an interposed spring loaded, ball check valve 229 to prevent any noticeable delay of the dump valve 174 in moving to dump position. Therefore, "dumping" of the dump valve to the left as viewed in FIG. 2 displaces oil, forcing the valve 229 to uncheck and unseat, and readily dumping oil through lower leg 223 toward the lowered pressure P1 in the connection 38 then leading to an empty clutch.

ACTUAL PRACTICE — FIG. 8

To this point, a diagrammatically shown two-leg component has been described. But in actual practice the general purpose application, modifications hereof will be accomplished with simply a valve 48 and chamber 80 connection 221 and with interposition of a simple flow-check valve 231 in a single-leg conduit component serving as the connection 213c. After the fashion of the conventional flowcheck, compact arrangement, the outwardly unseating, spring pressed ball check 233 of valve 231 has its seat accurately drilled with a calibrated restriction 235. So dumping of the dump valve, not shown, is attended by the outward-opening ball check 233 opening by leaving its seat, with the restriction 235 being ineffective. But flow in the opposite direction causes the ball check 233 to remain seated or to seat toward the dump valve, not shown, whereas flow through the seat restriction 235 controls closing of the dump valve with desired slowness.

The valve 48 to chamber 80 interconnection 221 is retained as before, to facilitate 2d and 3d gear shifts.

SHIFT MADE TO 2D GEAR SETTING — FIGS. 7, 1, 2

While the end-of-fill point is critical insofar as pressure is concerned, the previously described shorter rate of rise interval I1 is not in and of itself undesirable. That is to say, the desired rate of rise interval I2 indicated in FIG. 7 may be effectively shortened in a manner now to be described, without sacrifice of a smooth clutch engagement.

In FIG. 7, the pressure trace will desirably have a steeper straight slope than shown by the curve 224 when a direction change is made while the transmission 10, not shown, remains in second gear. That is, in the higher speed gear compared with first gear, a speed clutch change is not felt so abruptly; hence the speed clutch can go into engagement smoothly at a relatively higher constant rate of rise of pressure, and the interval I2 will consequently be shorter.

In FIG. 1, the speed valve spool 48 in the way described has the speed 2 position wherein the spool land 120 uncovers the mouth of the first auxiliary passage 122 which is in reality an orifice. Such orifice provides a second means of connection to the signal pressure chamber 82, supplementing the timing orifice flow described already as the first means of connection to the signal pressure chamber 82.

In FIG. 2, the orifice formed by the first auxiliary passage 122 communicates restricted flow through a gallery into a bore core 228, thus feeding the signal pressure chamber 82 and establishing a new larger fixed rate of flow whereby the load piston 164 moves on load stroke at a faster constant rate, for a correspondingly shorter period of linear rate of pressure rise of both the signal pressure S and the valve modulated first output pressure P1. So the rate of rise interval I2 earlier described will be shorter but will cover the same full range of pressure, namely, from roughly 60 psi (4.1 Atmos.) as previously to 300 psi (20.4 Atmos.) as previously.

SHIFT INTO THIRD GEAR — FIG. 2

When the transmission 10, not shown, is upshifted into third gear, the subsequent rate of rise in pressure following fill will be established not only as described, by the first and second means of connection to the signal pressure chamber 82, but also by a third means of connection consisting of the second auxiliary passage 124 which is more or less unrestricted and which communicates essentially the full pressure P1 through a gallery and into the bore core 228 which feeds the signal pressure chamber 82. Although the end points of the rate of rise curve 224, not shown, have the same pressure ordinates at start and finish, the slope is made much steeper and the constant rate of pressure rise is an appreciably larger figure. In other words, a shift when speed 3 is involved can be made both rapidly and smoothly, albeit in the shortest rate of rise interval I2.

SPEED CHANGE IN SAME RANGE — FIG. 1

Speed changes such as the foregoing can be made from among the selected ones of the piston and cylinder units 1, 2, or 3 without disturbing the direction valve spool 54, which can be left remaining in the forward position F, for example, as shown in FIG. 1.

Hence, the clutch filling process will involve only the selected speed clutch, and the clutch F will remain filled during the change speed.

SHIFT CYCLE PRESSURE CURVES — FIG. 9

The solid line curve 230 represents the pressure trace of valve output P1 and also valve output pressure P2 during a full cycle. The broken line curve 232 represents the signal pressure S trace for the same cycle.

Following the pressure drop of both pressures at the outset of a shift, represented as essentially vertical straight lines at the extreme left, the simulated clutch fill piston 194, not shown, insures an approximate 30 psi differential of the pressure P1 over the signal pressure S during the immediately ensuing fill interval F1.

Following fill, the sharp 10 psi pressure rise reflected at 234 in the solid line curve 230 and reflected at 236 in the broken line curve 232 is due to the sudden drop in flow upon filling of the clutch involved. That is, both pressures rise by about the amount of pressure rise across fill orifice 32, not shown, which no longer will generate any appreciable drop thereacross.

The major portions of the curves 230 and 232 representing the modulated linear rates of rise of pressure and also those horizontal portions representing the equilibrium time E1 at full clutch pressure show a constant differential of about 30 psi between the pressures P1 and S due to the equivalent 30 psi mechanical compression residual in the modulation valve spring 104, FIG. 2.

SIMULTANEOUS SHIFT — FIG. 8

In a shift requiring that the transmission go from a condition of, for instance, R1 to F2, both the speed spool 48 and the direction spool 54, not shown, are newly positioned and newly detented in their respective new positions. The piston and cylinder unit F and also the piston and cylinder unit 2 require filling, so that the normally rather short fill time F will appear on the pressure trace as just about twice as long an interval as the previous fill time F1 discussed in connection with FIG. 8. Otherwise, the rate of rise modulation curves will appear the same and both clutch engagements will occur in the desired way.

It will be apparent from the foregoing that my novel arrangement makes the scheduling function independent of the variables of the system such as line resistance, pressure drop, and clutch piston displacement. So the starting rise pressure will always be at a reduced level in the scheduling cycle and smooth clutch engagement will be assured. Almost as soon as the clutch cylinder or cylinders complete filling each time, the dump valve will shift rightwardly as shown in the drawings into fully closed position, and the simulated clutch piston after bottoming will reset rightwardly to its starting position as viewed in the drawings, all ready for the next shift. In effect the piston 194 located inside sleeve 188 within the dump valve cavity, FIG. 5, is like a small clutch piston being subjected to an equal or at least an equivalent pressure during clutch fill as the clutch of the selected group or clutches of the selected groups are being likewise subjected. Therefore despite its relative hydraulic remoteness to the latter, the rate of rise valve assembly in housing 26 essentially knows the actual clutch pressure PA because PA is artificially approximated close-by by cavity pressure C in the differential chamber 80.

Variations within the spirit and scope of the invention described are equally comprehended by the foregoing description.

What is claimed is:

1. A rate of rise hydraulic system having a connection to individual lines of a piston-type, transmission-clutch group, wherein the fluid output of the system undergoes pressure loss to an actual clutch fill pressure in order to pass from said connection through said individual lines to reach a selected clutch piston, said hydraulic system comprising:
    a clutch pressure modulating valve and signal pressure control means both reciprocally mounted and in opposite ends of a bore formed by a valve housing, said clutch pressure modulating valve being arranged to afford flow of the system fluid output to said connection, out of pumped fluid supplied thereto from a pump source;
    said signal pressure control means comprising a dump valve member reciprocally movable in an open-dump direction in toward, and in a closed-seated direction outwardly from, the adjacent end of the bore, and a differential pressure chamber defined between and by the dump valve member and said bore end;
    said dump valve member cooperating with modulator loading means in said bore to define a signal pressure chamber;
    a selector valve member disposed in said housing at said connection having spool valve portions effective in progressive selector valve positions for cooperating with said individual lines to direct system fluid output to selected ones of the clutch pistons; and
    first (186) and second (122) means of connection leading from the dump valve member and selector valve member, respectively, utilizing first and second (116) branch sources of the system fluid output to supply therefrom rising signal fluid pressure to the fluid inside the signal pressure chamber;
    said first branch source utilized by the first means of connection comprising a restriction (227) therein hydraulically upstream of the dump valve member and first means of connection, in that order, to limit the dump valve in its outward direction of movement so as to seat without the sudden abruptness giving rise to transmission shift shock.

2. The invention of claim 1, further comprising:
    a third branch source (221) between the dump valve member (174) and selector valve member (48) utilizing system fluid output of the latter to supply fluid to the former, and opened by one (120) of said spool valve portions as the selector valve member progresses from one position to another for insuring said movement in the outward direction so that the dump valve seats.

3. The invention of claim 1,
    said second means of connection comprising an orifice (122) in said housing in communication with said signal pressure chamber and opened by one (120) of said spool valve portions as the selector valve member progresses from one position to another so as to increase flow of the signal pressure fluid supplied.

4. The invention of claim 3,
    said modulator loading means comprising biasing means (88) connected at one end to the clutch pressure modulating valve, and a first piston (164) confronting said dump valve member, said first piston connected to the other end of the biasing means and movable in the bore to load the biasing means and clutch pressure modulating valve in response to rising signal pressure for affording a rate-of-rise on the system fluid output pressure; and
    a second piston (194) movable in a bore in the differential pressure chamber to temporarily enlarge the volume of the same for affording a pressure drop to the systemoutput-fluid received therein.

5. The invention of claim 1,
    said first branch source (213b) utilized by the first means of connection comprising one-way-opening flow means (229) connected hydraulically in parallel with said restriction therein and openable to flow from said first means in a direction accommodating movement of the dump valve member freely into its open-dump position.

6. A rate of rise valve assembly for a pistonoperated transmission-clutch system, wherein the valve assembly fluid output undergoes pressure loss to an actual clutch fill pressure in order to reach an effected clutch piston of the transmission-clutch system, said assembly comprising:

a clutch pressure modulating valve and signal pressure control means oppositely disposed and both reciprocally mounted in a bore formed by a valve housing, with the clutch pressure modulating valve in a first end and the signal pressure control means in a second end of the bore;

a load piston in the bore intermediate its first and second ends, and arranged with the signal pressure control means to form a signal pressure chamber therebetween in the bore;

spring means arranged for loading interaction between the load piston and said valve;

said signal pressure control means including a differential pressure chamber, with a clutch fill piston (194) therein affording an enlargement of volume of the differential pressuer chamber during actual clutch fill; and means forming first and second paths leading respectively:

firstly, from the valve assembly fluid output (38) by way of a flow connection means (212) then through the differential pressure chamber, thence through first means in the signal pressure control means to the signal pressure chamber for causing a control stroke of the load piston against the spring means; and secondly, from the signal pressure chamber thence through second means in the signal pressure control means to drain, during actual clutch fill and corresponding enlargement of the differential pressure chamber by the clutch fill piston therein;

said second means in the signal pressure control means comprising a dump valve between the signal pressure chamber and drain, an openable and closeable upon reciprocation of the signal pressure control means (176);

said flow connection means in the first path comprising a restriction (227) hydraulically upstream of the differential pressure chamber and both the first and second means in the signal pressure control means, in that order, to limit the dump valve's closure upon reciprocation of the signal pressure control means so that the former seats without the sudden abruptness giving rise to transmission shift shock.

7. The invention of claim 6, characterized by:

the first means in the signal pressure control means comprising a fixed, timing orifice (186) between the differential (80) and signal pressure chamber (82).

8. The invention of claim 6, the dump valve in said signal pressure control means characterized by:

a dump valve member forming a side of the signal pressure chamber (82), said member intervening as aforesaid with respect to both the differential pressure chamber and the drain, and having a fixed timing orifice (186) therein forming said first means and a drain valve portion (180) forming said second means.

9. The invention of claim 6, characterized by:

said flow connection means in the first path comprising one-way-opening flow means (229) therein connected hydraulically in parallel with said restriction (227) therein and openable to flow in the first path in a direction accommodating movement of the dump valve freely into its open position.

* * * * *